US011167699B2

(12) United States Patent
Wilckens et al.

(10) Patent No.: US 11,167,699 B2
(45) Date of Patent: Nov. 9, 2021

(54) ACCESSORY ATTACHMENT SYSTEM

(71) Applicant: Textron Inc., Providence, RI (US)

(72) Inventors: Blake Henry Wilckens, Evans, GA (US); Derral Edward Creswell, III, Grovetown, GA (US); Jeffrey Lloyd Nabors, Aiken, SC (US); Scott Timothy Keziah, North Augusta, SC (US)

(73) Assignee: TEXTRON INNOVATIONS INC., Providence, RI (US)

( * ) Notice: Subject to any disclaimer, the term of this patent is extended or adjusted under 35 U.S.C. 154(b) by 277 days.

(21) Appl. No.: 16/548,275

(22) Filed: Aug. 22, 2019

(65) Prior Publication Data

US 2019/0375340 A1    Dec. 12, 2019

Related U.S. Application Data

(63) Continuation of application No. 14/957,692, filed on Dec. 3, 2015, now Pat. No. 10,427,616.

(51) Int. Cl.
*B60R 11/00* (2006.01)
*F16B 21/04* (2006.01)

(52) U.S. Cl.
CPC .............. *B60R 11/00* (2013.01); *F16B 21/04* (2013.01); *B60R 2011/0061* (2013.01)

(58) Field of Classification Search
CPC .. B60R 11/00; B60R 2011/0061; F16B 21/04; F16B 3/00; F16B 3/005; F16B 3/04; F16B 3/06; F16B 5/0092; F16B 5/10
See application file for complete search history.

(56) References Cited

U.S. PATENT DOCUMENTS

| 2,378,638 | A |   | 6/1945 | Johnson |
|---|---|---|---|---|
| 2,399,750 | A |   | 5/1946 | Marty |
| 2,508,616 | A | * | 5/1950 | Marty, Sr. ................. F16B 5/10 411/550 |
| 2,560,519 | A |   | 7/1951 | Bedford, Jr. |
| 3,179,457 | A |   | 4/1965 | Johnson |

(Continued)

FOREIGN PATENT DOCUMENTS

| CA | 2693558 A1 | 1/2009 |
|---|---|---|
| DE | 1900078 A1 | 9/1969 |
| GB | 1331750 A | 9/1973 |

*Primary Examiner* — Jacob J Cigna
(74) *Attorney, Agent, or Firm* — Sandberg Phoenix & von Gontard, P.C.

(57) ABSTRACT

An accessory attachment system comprising a fastening key having an accessory retention cap, a stem extending from the retention cap, and at least one bit extending laterally from a distal end of the stem. The stem configured to be inserted through a key aperture in an accessory to be attached to the vehicle. The system includes a locking bracket connectable to the vehicle adjacent an accessory portal provided in the vehicle. The locking bracket comprises a base plate, a keyhole disposed through the base plate, and at least one inclined securing structure disposed along a circumference of the keyhole. Each securing structure comprises a ramp and a detent. The keyhole is configured to receive the stem distal end and bit(s) therethrough, and each securing structure is configured to engage the bit(s) and interlock the fastening key with the locking bracket upon rotation of the key.

20 Claims, 8 Drawing Sheets

(56) References Cited

U.S. PATENT DOCUMENTS

| | | | |
|---|---|---|---|
| 3,220,077 | A | 11/1965 | Newcomer, Jr. et al. |
| 3,415,086 | A * | 12/1968 | Trainor .................... E05C 5/02 |
| | | | 70/240 |
| 3,816,883 | A | 6/1974 | Dzus, Sr. et al. |
| 3,838,802 | A | 10/1974 | Grycel, III |
| 4,067,090 | A | 1/1978 | Schenk |
| 4,227,287 | A | 10/1980 | Gunther |
| 4,564,216 | A | 1/1986 | Kinyon et al. |
| 4,825,670 | A | 5/1989 | Snow |
| 5,484,240 | A * | 1/1996 | Rosenberg ............ B60P 7/0815 |
| | | | 296/43 |
| 7,055,454 | B1 | 6/2006 | Whiting et al. |
| 7,222,582 | B1 | 5/2007 | Whiting et al. |
| 7,975,640 | B1 | 7/2011 | Whiting et al. |
| 8,267,034 | B2 | 9/2012 | Whiting et al. |
| 8,403,612 | B2 * | 3/2013 | Wright .................... B60R 22/24 |
| | | | 411/367 |
| 8,777,531 | B2 | 7/2014 | Massicotte et al. |
| 8,813,673 | B2 | 8/2014 | Whiting et al. |
| 2005/0169725 | A1 | 8/2005 | Asmuth et al. |
| 2005/0224539 | A1 | 10/2005 | Hardy et al. |
| 2008/0279651 | A1 * | 11/2008 | Bulow .................... F16B 5/10 |
| | | | 411/103 |
| 2011/0070018 | A1 | 3/2011 | Nedelman et al. |
| 2013/0133964 | A1 | 5/2013 | Massicotte et al. |
| 2014/0197218 | A1 * | 7/2014 | Jordan ................ B60Q 1/0483 |
| | | | 224/545 |
| 2014/0341634 | A1 | 11/2014 | Chatwin et al. |
| 2017/0066383 | A1 | 3/2017 | Benedict et al. |
| 2018/0099714 | A1 | 4/2018 | Whitten et al. |

\* cited by examiner

ACCESSORY ATTACHMENT SYSTEM

CROSS-REFERENCE TO RELATED APPLICATIONS

This application is a continuation of U.S. patent application Ser. No. 14/957,692 filed on Dec. 3, 2015, the disclosure of which is incorporated herein by reference in its/their entirety.

FIELD

The present teachings relate to a system for attaching various structures to a vehicle, more particularly, to a quick attachment and removal system that can be used to attach various structures to a vehicle.

BACKGROUND

The statements in this section merely provide background information related to the present disclosure and may not constitute prior art.

Vehicle owners often find it desirable to attach or mount one or more vehicle accessory to their vehicle. For example, owners of pickup trucks, automobiles, utility vehicles, all-terrain vehicles, maintenance vehicles, cargo vehicles, shuttle vehicles, utility terrain vehicles, utility task vehicles, recreational off highway vehicles, worksite vehicles, buggies, motorcycles, watercrafts, snowmobiles, golf carts, etc., often desire to attach or mount accessories such as a gun rack, ladder rack, lawn equipment rack, toolbox, storage box, cargo bed tie-downs, cargo bed extender, fuel storage container, spare tire storage apparatus, cooler, etc., to their vehicle. Typically the installation of such accessories requires drilling holes into the vehicle at the desired location and the bolting or screwing the accessory to vehicle. This can be time consuming, difficult, and requires extra hardware.

SUMMARY

In various embodiments, the present disclosure provides an accessory attachment system for quickly and easily attaching a vehicle accessory to a vehicle. The accessory attachment system generally includes a fastening key and a locking bracket, wherein the fastening key and locking bracket are structured and operable to be removably interlockable with each other. In various implementations, the fastening key comprises an accessory retention cap, a stem extending from the retention cap and at least one bit extending laterally from a distal end portion of the stem. In various implementations the locking bracket comprises a base plate, a keyhole disposed through the base plate, and at least one inclined securing structure disposed along at least a portion of a circumference of the keyhole. In some embodiments, each inclined securing structure comprises a ramp portion and a detent disposed at distal end of ramp portion. In operation the stem of the fastening key can be inserted through a key aperture in an accessory to be attached to the vehicle, through an accessory portal in the vehicle, and through the key hole in the base plate, such that the bit(s) align(s) with a proximal end of the ramp portion of a corresponding inclined securing structure(s). Subsequently, the fastening key can be rotated about its longitudinal axial such that bit(s) is/are advanced along and up the ramp(s) of the inclined securing structure(s) until the bit(s) are disposed within the detent(s), thereby interlocking the fastening key with the locking bracket and securing the accessory to the vehicle.

Other embodiments, aspects, and advantages will become apparent from the following detailed description taken in conjunction with the accompanying drawings which illustrate, by way of example, the principles of the described embodiments. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
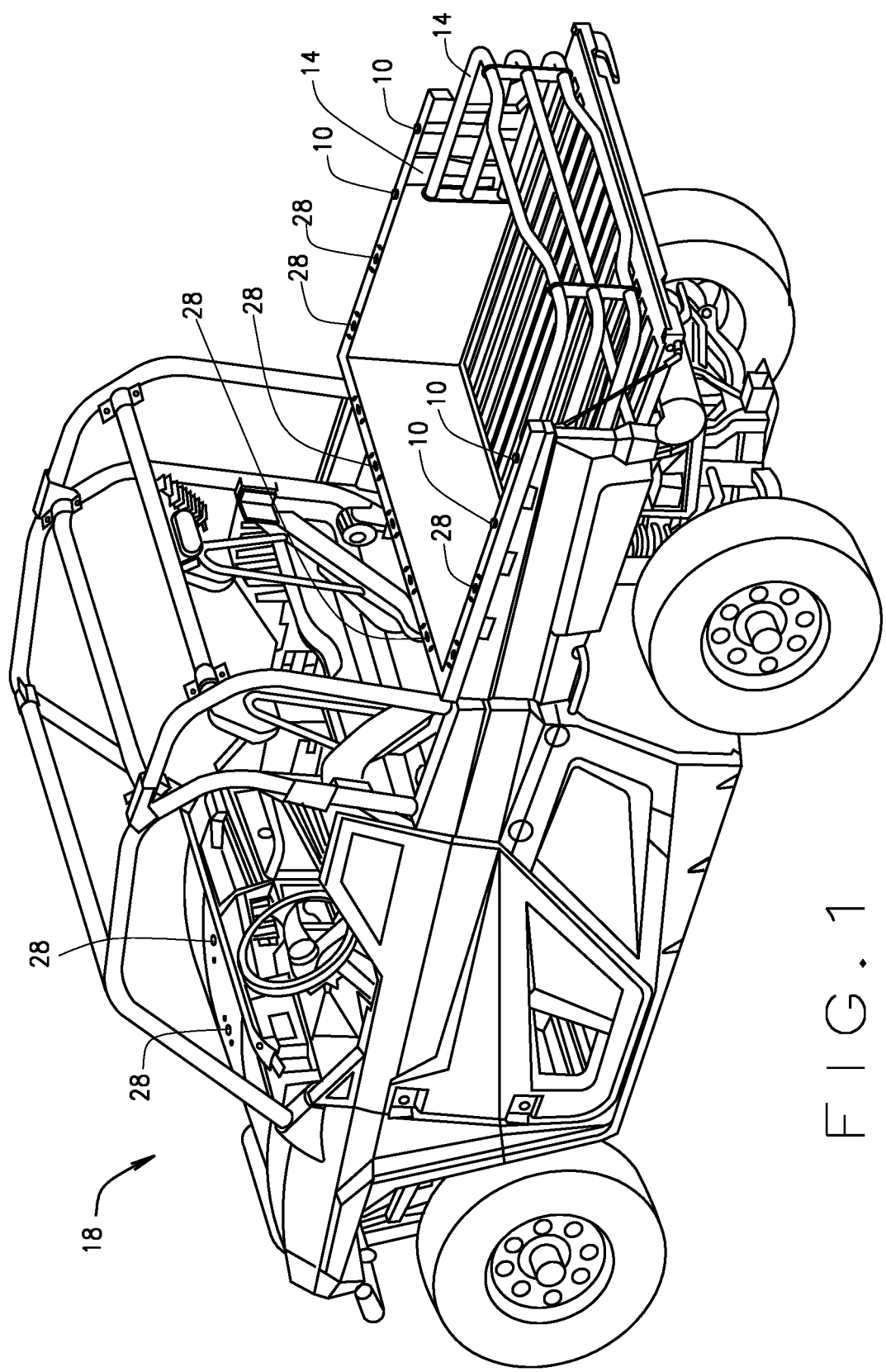
FIG. 1 is an isometric view of a vehicle having a vehicle accessory connected to or with a cargo bed of the vehicle, via one or more accessory attachment system, in accordance with various embodiment of the present disclosure.

The following description is merely exemplary in nature and is in no way intended to limit the present teachings, application, or uses. Throughout this specification, like reference numerals will be used to refer to like elements.

The embodiments disclosed below are not intended to be exhaustive or to limit the invention to the precise forms disclosed in the following detailed description. Rather, the embodiments are chosen and described so that others skilled in the art can utilize their teachings. While the present disclosure is primarily directed to a utility vehicle, it should be understood that the features disclosed herein are applicable to other types of vehicles such as pickup trucks, automobiles, all-terrain vehicles, maintenance vehicles, cargo vehicles, shuttle vehicles, utility terrain vehicles, utility task vehicles, recreational off highway vehicles, worksite vehicles, buggies, motorcycles, watercrafts, snowmobiles, and golf carts.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

As used herein, the term "and/or" includes any and all combinations of one or more of the associated listed items. Although the terms first, second, third, etc. can be used herein to describe various elements, components, regions, devices, objects, sections, etc., these elements, components, regions, devices, objects, sections, etc., should not be limited by these terms. These terms may be used only to distinguish one element, component, region, device, object, section, etc., from another region, device, object, section etc., and do not necessarily imply a sequence or order unless clearly indicated by the context. Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept (s) herein taught, and because many modifications may be made in the embodiments described herein, it is to be understood that the details herein are to be interpreted as illustrative and non-limiting.

When an element, device, apparatus, component, etc., is referred to as being "on," "engaged to," "connected to," or "coupled to" another element device, apparatus, component, etc., it may be directly on, engaged, connected or coupled to the other element or device, apparatus, component, etc., or intervening elements or devices, apparatus, components, etc., may be present. In contrast, when an element is referred to as being "directly on," "directly engaged to," "directly connected to," or "directly coupled to" another element or device, apparatus, component, etc., there may be no intervening elements or layers present. Other words used to describe the relationship between elements should be interpreted in a like fashion (e.g., "between" versus "directly between," "adjacent" versus "directly adjacent," etc.).

Referring to FIG. 1, in various embodiments, the present disclosure provides quick-connect-and-disconnect accessory attachment system 10 that is structured and operable to quickly and easily attach and detach (e.g., connect and disconnect) an accessory 14 to and from a vehicle 18. It should be understood that one or more attachment systems 10 can be used to attach a particular accessory 14 to the vehicle 18. Although it will be understood that the attachment system 10 can be used to quickly and easily attach and detach an accessory 14 to and from a vehicle 18, for the sake of brevity, the attachment system 10 will be described herein with regard to the operation of attaching the accessory 14 to the vehicle 18. One skilled in the art will readily understand the operation of detaching the accessory 14 without further description. Additionally, although the accessory 14 is illustrated in FIG. 1, by way of example, as a cargo bed extender, the attachment system 10 can be implemented to attach any desired accessory to the vehicle 18. For example, the attachment system 10, as described herein, can be used to attach accessories such as a gun rack, ladder rack, lawn equipment rack, toolbox, storage box, cargo bed tie-downs, fuel storage, spare tire storage apparatus, cooler, etc., to the vehicle 18. Furthermore, although the vehicle 18 is illustrated in FIG. 1, by way of example, as a side-by-side off-road recreational vehicle, the vehicle 18 can be other vehicle such as a pickup truck, automobile, utility vehicle, all-terrain vehicle, maintenance vehicle, cargo vehicle, shuttle vehicle, utility terrain vehicle, utility task vehicle, other style of recreational off road or off highway vehicle, worksite vehicle, buggy, motorcycle, watercraft, snowmobile, golf cart, etc.

Figure 2:
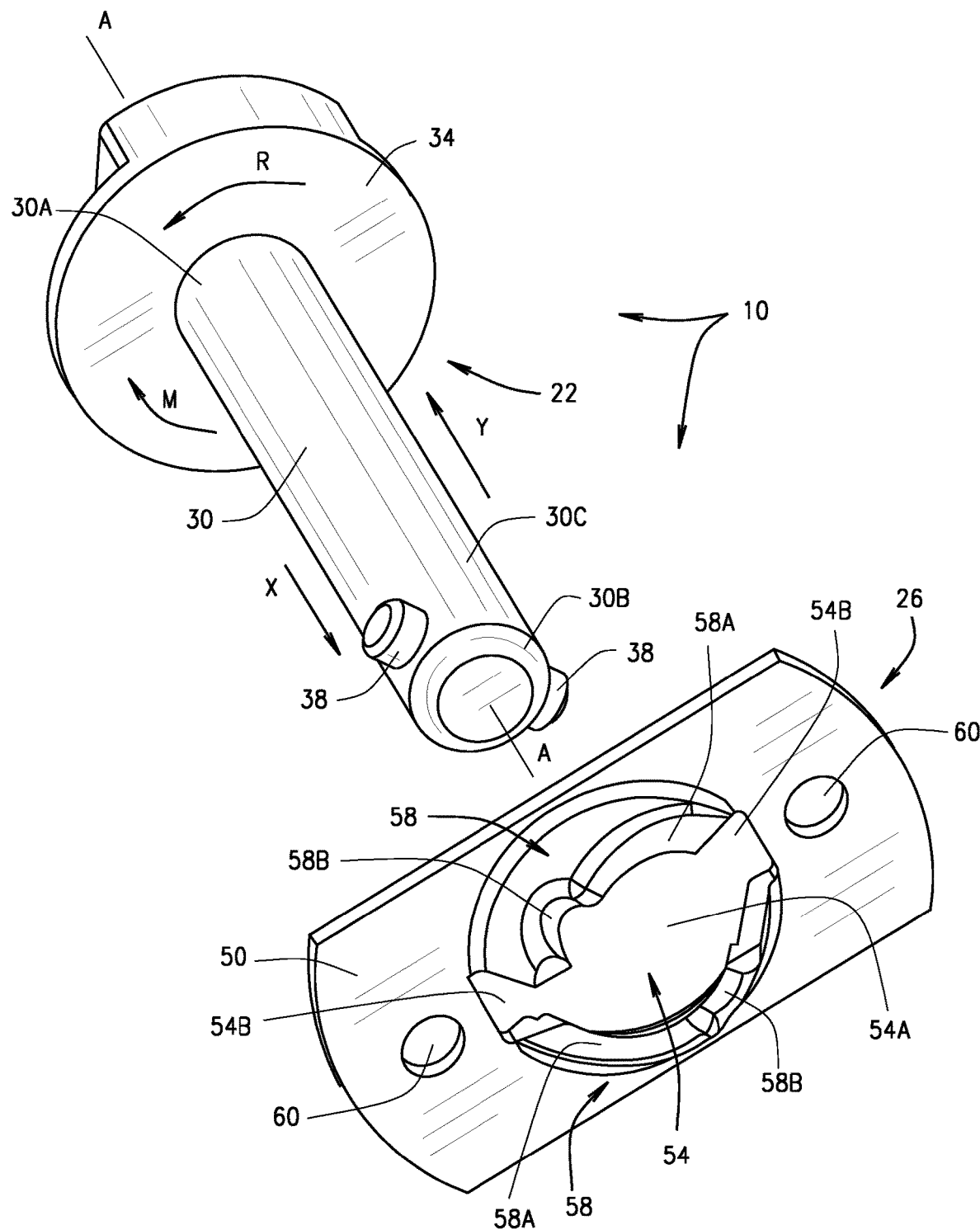
FIG. 2 is an isometric exploded view of the attachment system shown in FIG. 1, in accordance with various embodiments of the present disclosure.

Referring now to FIG. 2, in various embodiments, the attachment system 10 generally comprises a fastening key 22 and a locking bracket 26. As described further below, the locking bracket 26 is structured and operable to be connectable to, or integrated with, the vehicle 18 adjacent an accessory portal 28 provided in the vehicle 18. The vehicle 18 can include one or more accessory portals 28 disposed at one or more desired locations of the vehicle. For example, the vehicle 18 can include a plurality of accessory portals 28 disposed along the top edge or top rail of one or more cargo bed walls, or along an interior or exterior surface of one or more cargo bed walls, or at various desired locations on the hood or front cowl of the vehicle 18, or at various desired locations on the interior and/or exterior of the passenger compartment, or at various locations of an auxiliary storage compartment located between the passenger seat(s) and the cargo bed, or some combination thereof, etc.

As described further below, the fastening key 22 is removably interlockable with locking bracket 26 to fasten and hold, e.g., attach, an accessory 14 (shown in FIG. 1) to the vehicle 18 (shown in FIG. 1). The fastening key 22 includes a stem 30, an accessory retention cap 34 disposed at a proximal end 30A of the stem 30, and at least one bit 38 extending laterally (e.g., extending substantially perpendicular to a longitudinal axis A of the stem 30) from a portion of the stem 30 at or near a distal end 30B of the stem 30, referred to herein as the distal end portion 30C. The cap 34 can be connected to or with (e.g., welded, glued, screwed, pressed fitted, etc.) or integrally formed with the stem 30. Similarly, the at least one bit 38 can be connected to or with (e.g., welded, glued, screwed, press fitted, etc.) or integrally formed with the stem 30.

Figure 3:
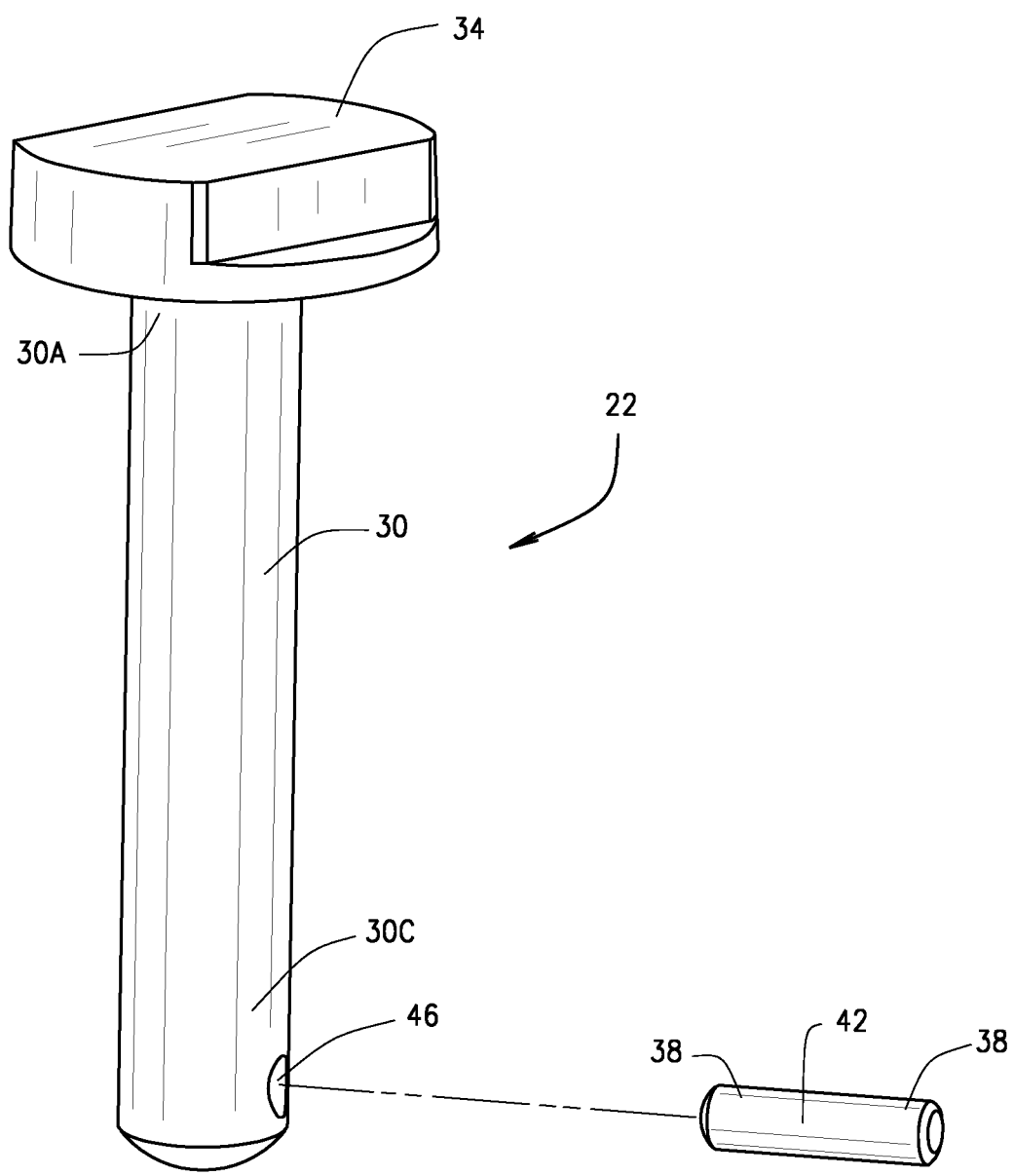
FIG. 3 is an isometric exploded view of a fastening key of the attachment system shown in FIG. 1, in accordance with various embodiments of the present disclosure.

For example, as illustrated by way of example in FIG. 3, in various embodiments, the fastening key 22 can comprise a dowel rod 42 insertable through a lateral bore 46 in the distal end portion 30C of the stem 30. For example, in some instances the dowel rod 42 can have a length greater than a diameter of the fastening key stem 30 such that dowel rod 42 can be inserted through or into the bore 46 and laterally extend from the side(s) of stem 30 to provide at least one bit 38 (e.g., two opposing bits 38 that extend from diametric opposite sides of the stem). In such embodiments, the fastening key 22 can be fabricated to have the dowel rod 42 installed in the stem 30 prior to receipt of the attach-system 10 by a consumer for use to attach the accessory 14 to the vehicle 18, or the dowel rod 42 can be inserted by the consumer prior to use of the attachment system to attach the accessory 14 to the vehicle 18.

In various embodiments, the dowel rod 42 can be sized to be press fit into the bore 46, or alternatively, the dowel rod 42 can be affixed within the bore 46, e.g., welded, soldered, glued, etc. The cap 34, stem 30 and bit 38 (e.g., dowel rod 42) can be fabricated of any desired material, e.g., metal, plastic, nylon, polycarbon, etc. Moreover, any one or more of the cap 34, stem, and bit 38 can be fabricated from the same or different materials.

The locking bracket 26 comprises a base plate 50 having a keyhole 54 disposed therethrough that is structured and operable to receive the stem distal end portion 30C and bit(s) 38 of the fastening key 22. For example, in various embodiments the keyhole 54 can include a central portion 54A sized and shaped to allow the stem 30 to pass therethrough, and one or more wings 54B sized and shaped to allow the one or more bits 38 to pass therethrough. Hence, in such embodiments, in order to insert the stem distal end portion 30C through the keyhole 54, the bit(s) 38 must be aligned with the wing(s) 54B. The locking bracket 26 additionally includes at least one arcuate inclined securing structure 58. In this regard, for example, the locking bracket 26 of some embodiments includes one arcuate inclined securing structure 58 for each bit 38. Each arcuate inclined securing structure 58 is disposed along at least a portion of a circumferential edge of the keyhole 54 and extends laterally from the base plate 50, e.g., substantially perpendicular the plane of the base plate 50. As used with reference to the inclined securing structure 58, arcuate is meant to describe that each inclined securing structure 58 has a curvature substantially equivalent to that of the circumferential edge of the keyhole 54 from which the respective inclined securing structure 58 extends. For brevity, in many instances herein, the arcuate inclined securing structure(s) 58 will be referred to as merely the inclined securing structure(s) 58. As described further below, each inclined securing structure 58 is structured and operable to engage and interlock with a corresponding bit 38 to thereby interlock the fastening key 22 with the locking bracket 26, and thereby attached the accessory 14 to the vehicle 18.

In various embodiments, the locking bracket 26 can include one or more attachment hole 60 through which a fastener, e.g., a screw, bolt or rivet, can be inserted to attach the locking bracket 26 to the vehicle 18 adjacent the accessory portal 28. Alternatively, in other embodiments, the locking bracket 26 can be attached to the vehicle 18 via any other suitable attachment means or method, e.g., welding or gluing. In yet other embodiments, it is envisioned that a locking bracket 26 can be integrally formed with a respective vehicle component to which an accessory 14 can be attached, e.g., the cargo bed wall or the hood/cowl, adjacent each accessory portal 28 of the vehicle 18, such that the inclined securing structure 58 is integrally formed with the respective vehicle component (e.g., the inclined securing structure can be molded into the respective vehicle component).

In some embodiments, each inclined securing structure 58 comprises a ramp 58A and a detent 58B disposed at an end of the ramp 58A. In the embodiments wherein the keyhole 54 includes one or more wings 54B, each ramp 58A, can, for example, begin at and edge of a wing 54B and terminates at the respective detent 58B. Each ramp 58A of various example embodiments inclines laterally away from the base plate 50 at an angle, e.g., 5-45 degrees, and terminates at the respective detent 58B. Each ramp 58A and detent 58B, of such embodiments, are structured and operable to interlock the fastening key 22 with the locking bracket 26, and thereby fasten, or attach, the accessory 14 to the vehicle 18. More particularly, as described in detail below, to attach the accessory 14 to the vehicle 18, the distal end portion 30C of the fastening key stem 30 is inserted through a key aperture 62 in the accessory 14 (shown in FIG. 5 and described below), through the accessory portal 28 in the vehicle 18 and then through the keyhole 54 of the locking bracket 26 mounted adjacent the accessory portal 28, such that the bit(s) 38 extend(s) through the keyhole 54 and is/are positioned adjacent the beginning of a respective ramp 58A.

Thereafter, the fastening key 22 is rotated in a locking direction R, thereby moving each bit 38 along the corresponding ramp 58A and into the respective detent 58B. As each bit 38 advances along the inclined ramp 58A in the locking direction R toward the respective detent 58B, the interaction between the bit(s) 38 and the incline of ramp(s) 58A causes the fastening key 22 to move longitudinally in a tightening direction X until each bit 38 is disposed within the respective detent 58B. A resistive force on the stem 30 in an opposing direction Y, caused by the interaction of the accessory 14 with the cap 34 of the fastening key 22, will retain each bit 38 within the respective detent 58B, thereby interlocking the fastening key 22 with the locking bracket 26, and holding the accessory 14 in attachment to the vehicle 18. To remove the fastening key 22, and hence the accessory 14, the fastening key 22 is intentionally, and deliberately turned in an unlocking direction M, that is opposite the locking direction R, to force the pin(s) 38 out of the respective detent(s) 58B, whereafter the pin(s) 38 travel down the respective ramp(s) 58A, e.g., until the pin(s) align with the keyhole wings 54B, whereafter the fastening key 22 can be withdrawn through the locking bracket keyhole 54 and the adjacent accessory portal 28 in the vehicle 18, and the accessory 14 can be removed. It should be understood that the locking direction R and the unlocking direction M are shown the various figures merely as examples, and are not limiting. That is, it should be understood that the locking direction R and the unlocking direction M can be reversed from that which is shown in the various figures and remain within the scope of the invention.

Figure 4:
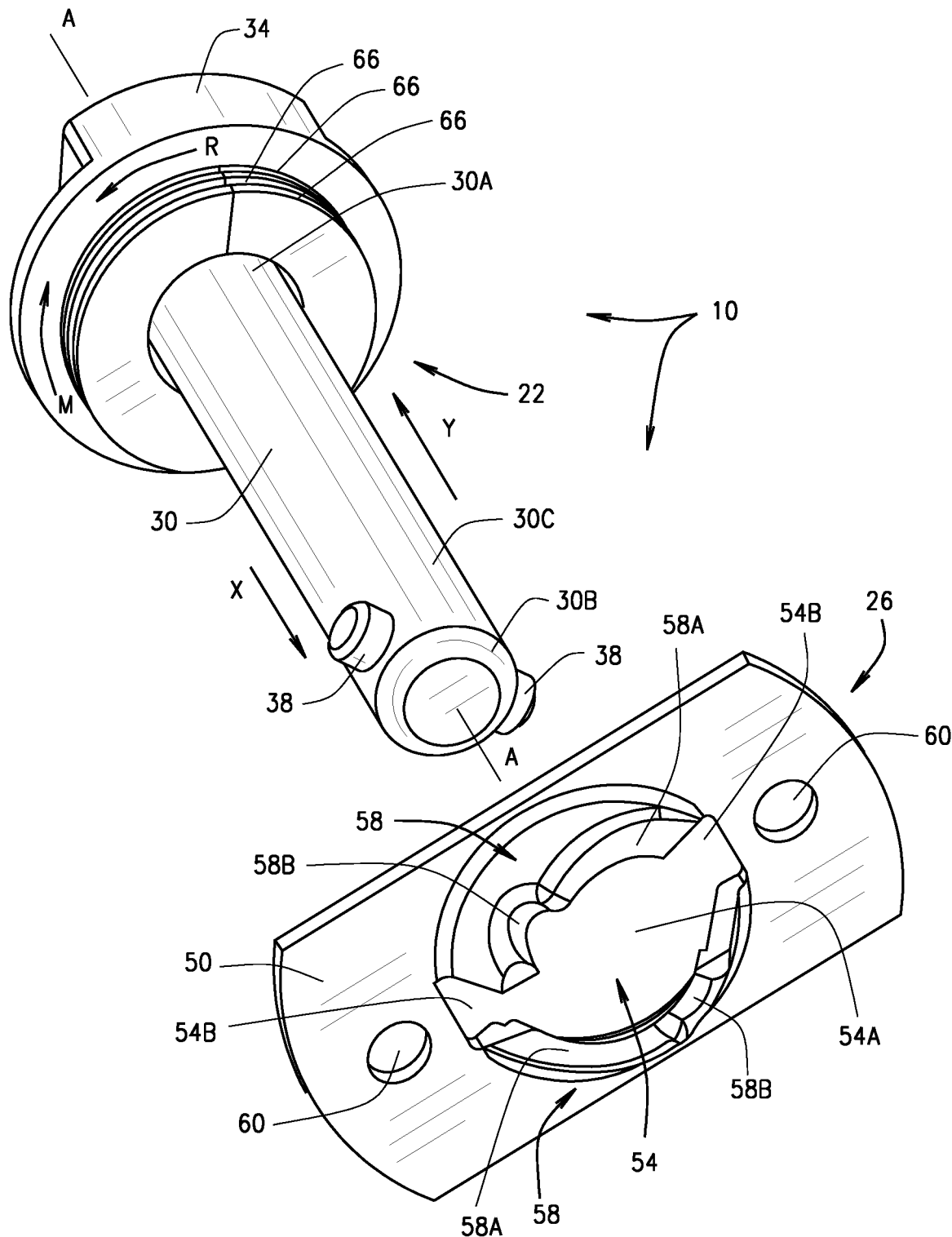
FIG. 4 is an exploded view of the fastening key of the attachment system shown in FIG. 1 including at least one biasing device, in accordance with various embodiments of the present disclosure.

Referring now to FIG. 4, in various embodiments, the attachment system 10 additionally includes one or more biasing devices 66 that is structured and operable to generate or add to the resistive force on the stem 30 in the opposing direction Y that retains each bit 38 within the respective detent 58B when the fastening key 22 is interlocked with the locking bracket 26, as described above. Particularly, the biasing device(s) 66 is/are disposed adjacent the retention cap 34 of the fastening key 22 such that when the stem 30 of fastening key 22 is inserted through the key aperture 62 in the accessory 14, the biasing device(s) 66 is/are disposed between the retention cap 34 and the accessory 14. Subsequently, when the stem 30 inserted through the accessory portal 28 in the vehicle 18 and the keyhole 54 of the locking bracket 26, and the fastening key 22 is rotated about the axis A in the locking direction R to advance the bit(s) 38 up the respective ramp(s) 58A of the respective inclined securing structure(s) 58 (pulling the fastening key 22 in the tightening direction X) and into the respective detent(s) 58B, the biasing device(s) 66 is/are resiliently compressed and generate the resistive force on the stem 30 in the opposing direction Y. The resistive force securely retains each bit 38 within the respective detent 58B such that the interlocking engagement of the fastening key 22 with the locking bracket 26 can only be disengaged by deliberate and intentional rotation of the fastening key 22 in the unlocking direction M. Moreover, the resistive force generated by the biasing device(s) 66 securely retains the respective accessory 14 in attachment to the vehicle 18, and provides stability to the attachment of the accessory 14 to the vehicle 18. The biasing device(s) 66 can be any device(s) suitable to be resiliently compressed and generate the resistive force on the stem 30 in the Y direction when the fastening key 22 is interlocked with the locking bracket 26, as described herein, e.g., one or more spring washers, one or more rubber or rubber-like bushings, one or more coil springs, and/or the like.

Alternatively, it is envisioned that in some embodiments the biasing device(s) 66 can be disposed within an internal bore of the stem 30 (not shown) and connected to or with a retention cap 34 longitudinally movably (e.g., movable in the X and Y directions) connected to or with the stem 30, and/or connected to or with the bit(s) 38 that can be longitudinally movably disposed within a slotted orifice in the distal end portion 30C of the stem 30. Hence, in such embodiments, the fastening key 22 would be 'spring-loaded' such that as the fastening key 22 is being interlocked with the locking bracket 26, the stem 30 will be resistively moved in the tightening direction X away from the retention cap 34, and/or the biased bit(s) 38 will be resistively moved in the tightening direction X within the slotted orifice. Then, once the bit(s) 38 are disposed within the detent(s) 58B, the internally disposed biasing device(s) 66 will generate the resistive force on the stem 30 in the opposing direction Y to securely retain the bit(s) 38 within the detent(s) 58B and thus retain the accessory 14 to the vehicle 18.

Figure 5:
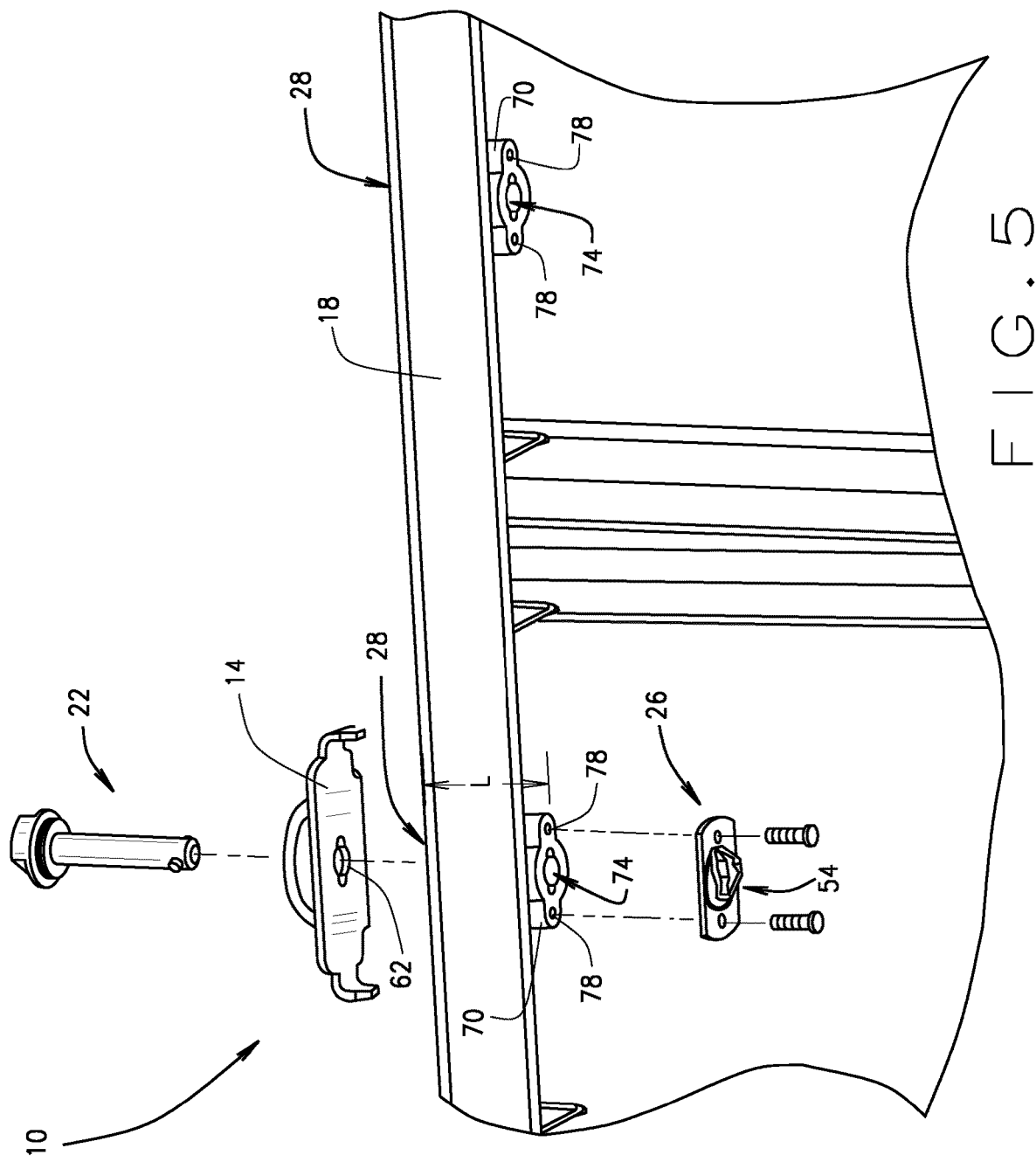
FIG. 5 is a sectional view of a side panel of a cargo bed of the vehicle shown in FIG. 1, wherein the a top rail of the side panel includes a plurality of stand-off fixtures of the accessory attachment system shown in FIG. 1, in accordance with various embodiments of the present disclosure.

Referring now to FIG. 5, in various embodiments, the attachment system 10 can include a stand-off fixture 70 disposed adjacent a corresponding accessory portal 28 in the vehicle 18. By way of example, FIG. 5 illustrates two stand-off fixtures 70 disposed adjacent corresponding accessory portals 28 provided in a top rail or edge of a side wall of the cargo bed of the vehicle 18. In various implementations, the stand-off fixture 70 is integrally formed with the respective vehicle component, part or structure in which the accessory portal 28 is disposed, e.g., integrally from with an underside of the cargo bed wall top rail. Alternatively, in various implementations the stand-off fixture 70 can be attached or connected to or with the vehicle 18 via any suitable connection means or device. For example, the stand-off fixture 70 can be screwed, bolted, welded, or riveted, etc., to the respective vehicle component, part or structure.

The stand-off fixture 70 comprises an internal bore 74 that extends longitudinally through the stand-off fixture 70. The internal bore is sized and shaped to receive, and allow to pass therethrough, the stem 30 and bit(s) 38. The stand-off fixture 70 is structured to have the locking bracket 26 connected to or with a distal end thereof. For example, in various instances, the stand-off fixture 70 can include one or more bracket mounting holes 78 that are structured and operable to receive, engage and connect with screws, bolts or rivets, for connecting the locking bracket 26 thereto. Alternatively, in various instances, the locking bracket 26 can be glued to, welded to, or integrally formed with the distal end of the stand-off fixture 70.

In such embodiments, when utilizing the attachment system 10 to attach the accessory 14 to the vehicle 18, the fastening key stem 30 and bit(s) 38 are inserted through the key aperture 62 in the accessory 14, the accessory portal 28 in the vehicle 18 (e.g., in the cargo bed wall top rail), the internal bore 74 of the stand-off fixture 70, and the keyhole 54 of the locking bracket 26. Thereafter, the fastening key 22 is rotated to dispose the bit(s) 38 within the detent(s) 58B of the locking bracket 26 to interlock the fastening key 22 with the locking bracket 26, and thereby attach the accessory 14 to the vehicle 18, as described above. Importantly, the stand-off fixture 70 is structured and operable to provide stability to the attachment of the accessory 14 to the vehicle 18 when the fastening key 22 is interlocked with the locking bracket 26. More particularly, the stand-off fixture 70 is structured and operable to place the location where the fastening key 22 interlocks with the locking bracket 26 a distance L away from the location where the accessory 14 is mounted to (e.g., connects with) vehicle 18. Accordingly, any moment of force the accessory 14 may impart on the fastening key 22, due to use or other forces applied to the accessory 14, is imparted at a point that is the distance L from the point where the accessory 14 contacts the vehicle 18, thereby providing increased stability to the attachment of the accessory 14 to the vehicle 18 when the fastening key 22 is interlocked with the locking bracket 26.

Figure 6:
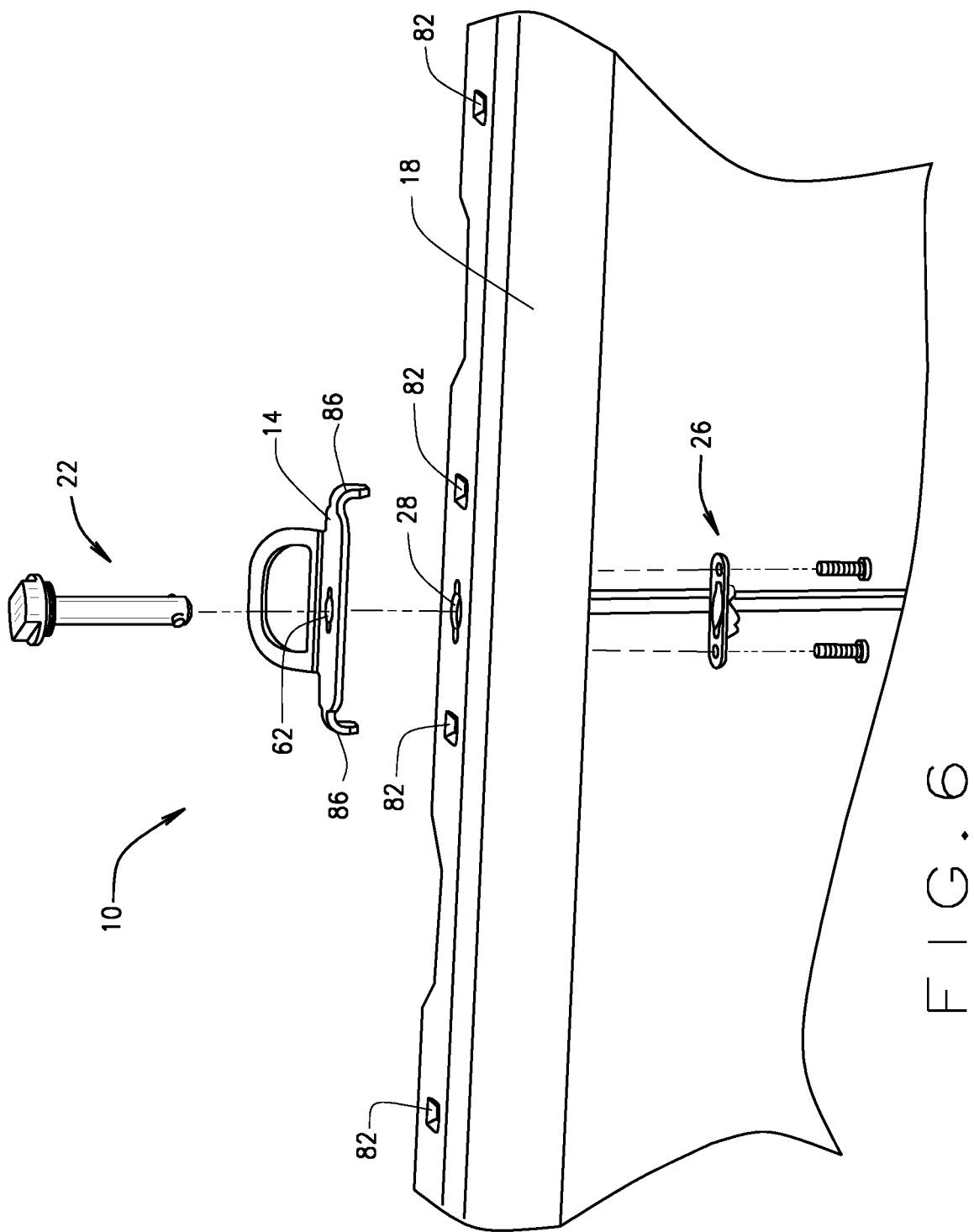
FIG. 6 is a sectional view of the side panel of a cargo bed of the vehicle shown in FIG. 1, wherein the a top rail of the side panel includes at least one anti-rotation aperture of the accessory attachment system shown in FIG. 1, in accordance with various embodiments of the present disclosure.

Referring now to FIG. 6, in various embodiments, the accessory attachment system 10 can further include at least one anti-rotation aperture 82 disposed in the vehicle 18 adjacent one or more accessory portal 28. Each anti-rotation aperture 82 is sized and shaped to receive an anti-rotation tab 86 provided on the accessory 14. Specifically, when the accessory 14 is mounted to the vehicle 18, via the attachment system 10, as described herein, each anti-rotation tab 86 of the accessory 14 is disposed within and substantially mates with a respective anti-rotation aperture 82. More specifically, when each anti-rotation tab 86 is disposed within a respective anti-rotation aperture 82, and the fastening key 22 is interlocked with the locking bracket 26, each anti-rotation tab 86 is securely retained with the respective anti-rotation aperture 82, thereby preventing rotation of the accessory 14 about the fastening key 22. The anti-rotation apertures and tabs 82 and 86 can have any desired size and shape such that each tab 86 can be disposed within a corresponding aperture 82 to prevent rotation of the accessory 14 about the fastening key 22 when the accessory 14 is secured to the vehicle 18 via the fastening key 22, as described herein.

Figure 7:
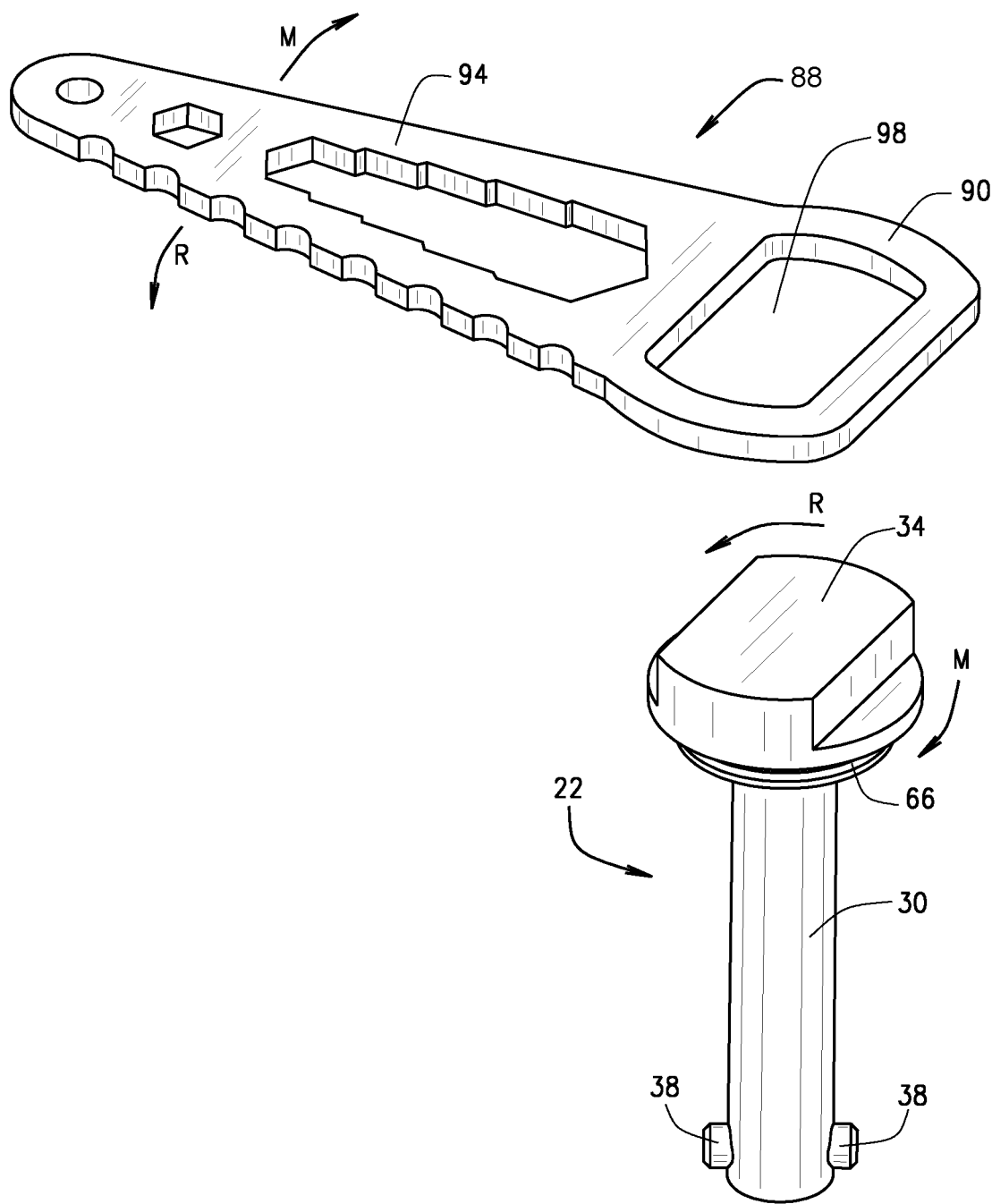
FIG. 7 is an isometric view of the fastening key and a fastening tool of the attachment system shown in FIG. 1, in accordance with various embodiments of the present disclosure.

Referring now to FIG. 7, in various embodiments, the accessory attachment system 10 can further include a fastening tool 88 that is structured and operable to engage the retention cap 34 of the fastening key 22 and rotate the fastening key 22 in both the locking and unlocking directions R and M to engage/interlock and disengage the fastening key 22 with and from the locking bracket 26, as described above. The fastening tool 88 of some embodiments includes an engagement head 90 and a handle 94 connected to or with the head 90. The head 90 is structured and operable to engage the retention cap 34 of the fastening key 22, and the handle 94 is structured and operable to be manipulated by a user to apply torque to the head 90 such that the head 90 and fastening key 22 can be rotated in the locking and unlocking directions R and M to engage/interlock and disengage the fastening key 22 with and from the locking bracket. The engagement head 90 and retention cap 34 can have any structure, shape, size or form suitable to allow engagement therebetween, whereby the tool 88 can be operated by a user to apply torque to the retention cap 34 capable of interlocking/engaging and disengaging the fastening key 22 with and from the locking bracket 26.

For example, in various embodiments, the retention cap 34 is formed (e.g., molded, cast, milled, machined, etc.) such that at least a portion of the cap 34 provides a shaped knob suitable for engagement and manipulation by the tool head 90. Additionally, the tool head 90 of some embodiments is formed (e.g., molded, cast, milled, stamped, machined, etc.) to include an opening 98 having a shape substantially complementary to the shape of the retention cap 34. The opening 98 can be opened (e.g., like an open end of a box wrench) or closed (e.g., like a closed end of a box wrench). In use, the opening 98 can be disposed over and/or around at least a portion of the knob of the retention cap 34, whereby the tool head 90 mates with and engages the retention cap 34. Consequently, a user can apply leverage to the handle 94 to rotate the tool head 90 and thereby apply torque to the retention cap 34 in the locking direction R or the unlocking direction M depending on whether the user wishes to engage/interlock or disengage the fastening key 22 with the locking bracket 26, as described herein. Accordingly, the fastening key 22 can be interlocked/engaged and disengaged with and from the locking bracket 26. Alternatively, it is envisioned that the tool head 90 can include a socket (not shown) that is sized and shaped to mate with the knob to apply torque to the retention cap 34 and thereby rotate the fastening to key 22 to interlock/engage the retention key 22 with and from the locking bracket 26.

In various other embodiments, it is envisioned that the tool 88 can be formed (e.g., molded, cast, milled, stamped, machined, etc.) to include a stud (e.g., a lug, boss or other protuberance) extending from the head 90 that is shaped or formed to matingly engage a shaped receptacle (e.g., a recess or pocket) formed (e.g., molded, cast, milled, machined, etc.) within the retention cap 34. The stud and matingly shaped receptacle can have any shape capable of transferring torque therebetween when leverage is applied to the handle 94, e.g., square, rectangular, hexagonal, triangular, star-shaped, etc. In such embodiments, the stud can be disposed within the receptacle of the retention cap 34 such that the tool head 90 mates with and engages the retention cap 34. Consequently, a user can apply leverage to the handle 94 to rotate the tool head 90 and thereby apply torque to the retention cap 34 to engage/interlock or disengage the fastening key 22 with the locking bracket 26, as described herein.

Figure 8:
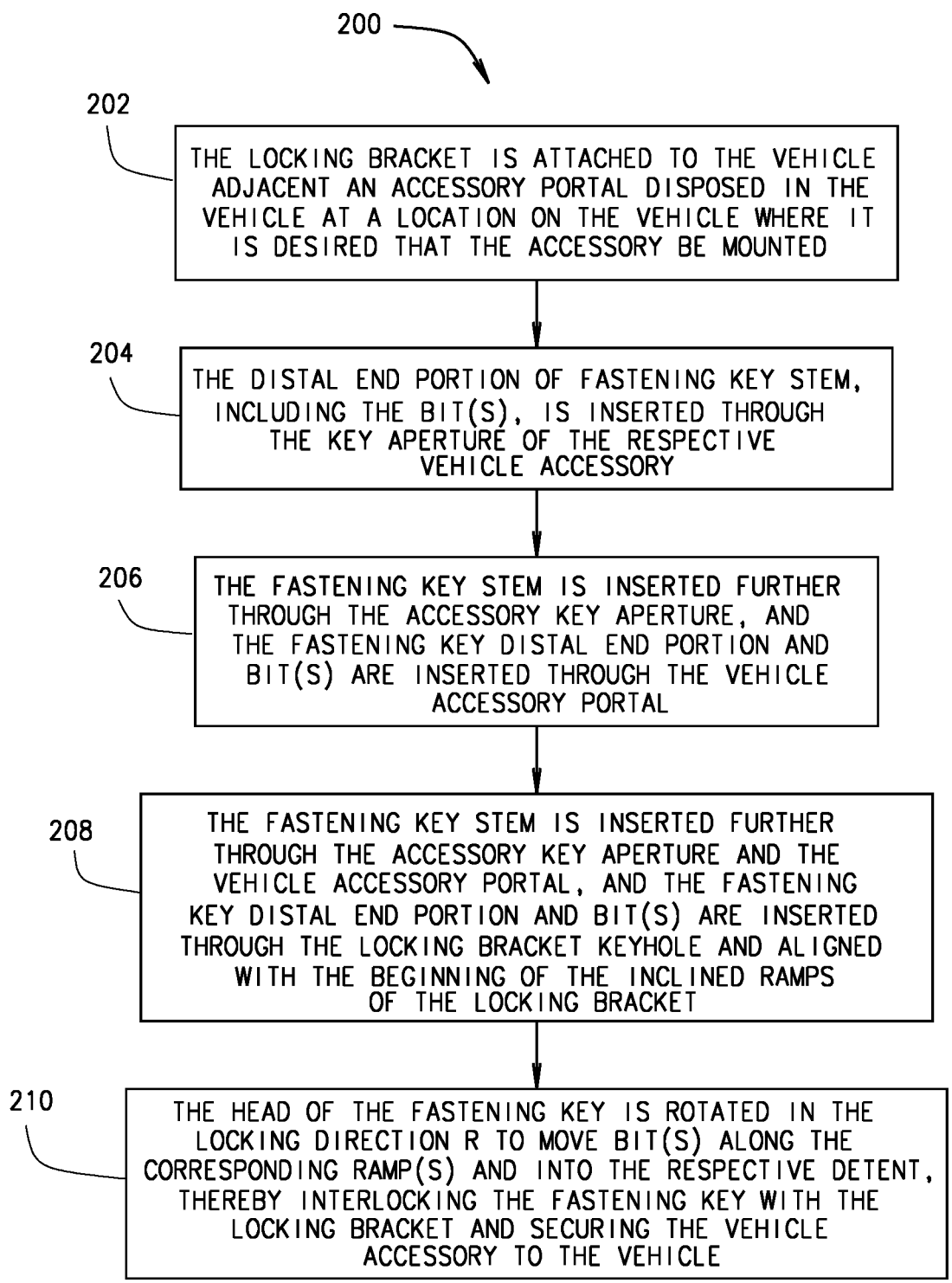
FIG. 8 is a flow chart illustrating a method for attaching a vehicle accessory to a vehicle, in accordance with various embodiments of the present disclosure.

FIG. 8 provides a flow chart 200 generally illustrating a method for using the attachment system 10 to attach a vehicle accessory 14 to the vehicle 18, in accordance with various embodiments. Initially the locking bracket 26 is attached to the vehicle 18 adjacent an accessory portal 28 disposed in the vehicle 18 at a location on the vehicle 18 where it is desired that the accessory 14 be mounted, as indicated at 202. As described above, in various embodiments the attachment system 10 can include a stand-off fixture 70 disposed adjacent the accessory portal 28. In such instances, the locking bracket 26 is attached to the distal end of the stand-off fixture 70, which is either integrally formed with the vehicle 18 or has been attached to the vehicle 18 adjacent the corresponding accessory portal 28. Once the locking bracket 26 has been attached to the vehicle 18 (e.g., attached to the distal end of the stand-off fixture 70), the distal end portion 30C of fastening key stem 22 (including the bit(s) 38), is inserted through the key aperture 62 of the respective vehicle accessory 14, as indicated at 204.

It is envisioned that the key aperture 62 in the accessory 14 can be aligned with the desired vehicle accessory portal 28 before or after the fasting key stem 22 and bit(s) 38 are inserted through the accessory key aperture 62. With the accessory key aperture 62 aligned with the desired vehicle accessory portal 28, the fasting key stem 22 is inserted further through the accessory key aperture 62, and the fastening key distal end portion 30C and bit(s) 38 are inserted through the vehicle accessory portal 28, as indicated at 206. Thereafter, the fastening key stem 22 is inserted further through the accessory key aperture 62 and vehicle accessory portal 28, and the fastening key distal end portion 30C and bit(s) 38 are inserted through the locking bracket keyhole 54 such that the fastening key cap 34 abuts a surface of the accessory 14 surrounding the accessory key aperture 62, at least a portion of the accessory 14 (e.g., at least a portion of the accessory 14 surrounding the accessory key aperture 62) abuts the surface of the vehicle surrounding the vehicle accessory portal 28, and the bit(s) 38 is/are positioned adjacent the beginning of the ramp(s) 58A of the corresponding inclined securing structure(s) 58, as indicated at 208. In the embodiments, wherein the attachment system 10 includes the stand-off fixture 70, the fastening key distal end portion 30C and bit(s) 38 are inserted through the stand-off fixture internal bore 74 prior to being inserted through the locking bracket keyhole 54.

Once the fastening key distal end portion 30C and bit(s) 38 have been inserted through the locking bracket keyhole 54, and the bit(s) 38 have been aligned with the beginning of the inclined securing structure ramp(s) 58A, the head of the fastening key 22 is rotated in the locking direction R to move bit(s) 38 along the corresponding ramp(s) 58A and into the respective detent 58B, thereby interlocking the fastening key 22 with the locking bracket 26 and securing the vehicle accessory 14 to the vehicle 18, as indicated at 210. As described above, as the bit(s) 38 move(s) along the ramp(s) 58A (e.g., move(s) up the ramp(s) 58A) the fastening key 22 is moved longitudinally in the tightening direction X, thereby pulling fastening key cap 34 into tight, firm contact with the accessory 14 such that the accessory 14 is pulled into tight, firm and stable contact with the vehicle surface surrounding the respective vehicle accessory portal 28. Moreover, the resistive force in the Y direction, generated when the accessory 14 is pulled into tight, firm and stable contact with the vehicle surface, will maintain the accessory 14 in tight, firm and stable contact with the vehicle 18 when the fastening key 22 is interlocked with the locking bracket 26. In the embodiments wherein the attachment system 10 includes one or more biasing device 66, as described above, the biasing device(s) 66 generate or add to the resistive force on the stem 30 in the Y direction, thereby attaching the accessory 14 to the vehicle 18 in secure and stable manner.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. An accessory system removable attachable to a vehicle, said system comprising:
   a vehicle accessory structured and operable to removably attach to a vehicle, said accessory comprising:
      an attachment plate;
      a key aperture extending through the attachment plate; and at least one anti-rotation tab extending orthogonally from the attachment plate;
an accessory portal provided in the vehicle;
at least one anti-rotation aperture disposed in the vehicle adjacent the accessory portal, the at least one anti-rotation aperture sized and shaped to receive the at least one anti-rotation tab to prevent rotation of the accessory when the accessory is attached to the vehicle;
a tubular stand-off fixture disposable adjacent the accessory portal, the stand-off fixture having a hollow elongated body with an internal lumen extending therethrough;
a locking bracket fixedly connectable to a distal end of the stand-off fixture, the locking bracket comprising:
 a base plate;
 a keyhole disposed through the base plate; and
 at least one inclined securing structure extending exteriorly from a back side of the base plate and disposed along at least a portion of a circumference of the locking bracket keyhole, and
a fastening key, the fastening key comprising:
 an accessory retention cap; and
 a stem extending from the retention cap, the stem including at least one bit fixedly disposed within and extending laterally from a distal end portion of the stem, the stem structured and operable to be inserted through the key aperture in the accessory, the accessory portal in the vehicle, the stand-off internal lumen, and the locking bracket keyhole,
wherein the at least one inclined securing structure of the locking bracket is structured and operable to engage the at least one bit extending laterally from the distal end portion of the stem and thereby interlock the fastening key with the locking bracket to attach the accessory to the vehicle.

2. The system of claim 1, wherein at least one of the at least one inclined securing structure comprises a ramp and a detent disposed at the end of the ramp, the ramp and detent structured and operable such that rotation of the fastening key will move each bit along a corresponding ramp and into the respective detent, thereby moving the fastening key longitudinally in a tightening direction and interlocking the fastening key with the locking bracket.

3. The system of claim 1 further comprising at least one biasing device disposable around the fastening key stem and structured and operable to provide a resistive force to the fastening key when the fastening key is interlocked with the locking bracket.

4. The system of claim 3, wherein the biasing device comprises at least one spring washer.

5. The system of claim 3, wherein the biasing device comprises at least one compressible bushing.

6. The system of claim 3, wherein the biasing device comprises at least one coil spring.

7. The system of claim 1, wherein the bit comprises a dowel rod extending laterally through the distal end portion of the fastening key stem.

8. The system of claim 1 further comprising a fastening tool structured to be engageable with the fastening key accessory retention cap such that the fastening tool can be used to interlock the fastening key with locking bracket.

9. The system of claim 8, wherein the fastening tool comprises a head and a handle extending from the head, wherein the head comprises an opening having a size and a shape matching a size and shape of a knob portion of the fasting key retention cap.

10. The system of claim 8, wherein the fastening tool comprises a head and a handle extending from the head, wherein the head comprises a socket having a size and a shape matching a size and shape of a knob portion of the fasting key retention cap.

11. The system of claim 8, wherein the fastening tool comprises a head and a handle extending from the head, wherein the head comprises a stud having a size and a shape matching a size and shape of a receptacle formed in the fasting key retention cap.

12. A method for attaching a vehicle accessory to a vehicle, said method comprising:
attaching a proximal end of a tubular stand-off fixture of an accessory attachment system to a first side of a portion of a body of a vehicle such that an internal lumen extending through a hollow elongated body of the stand-off fixture aligns with an accessory portal provided in the portion of the vehicle body;
fixedly attaching a locking bracket of the accessory attachment system to a distal end of the stand-off fixture, the locking bracket comprising:
 a base plate;
 a keyhole disposed through the base plate; and
 at least one inclined securing structure extending exteriorly from a back side of the base plate and disposed along at least a portion of a circumference of the keyhole, each inclined securing structure comprising a ramp and a detent disposed at the end of the ramp,
placing an attachment plate of a vehicle accessory in contact with an opposing second side of the portion of the body of the vehicle and adjacent the accessory portal provided in the vehicle body such that:
 a key aperture extending through the attachment plate aligns with the accessory portal in the portion of the vehicle body and the stand-off fixture internal lumen, and
 an anti-rotation tab extending orthogonally from the accessory attachment plate is inserted into an anti-rotation aperture disposed in the portion of vehicle body;
inserting a distal end portion of a stem of a fastening key of the accessory attachment system through the key aperture of a vehicle accessory, the accessory portal in the portion of the vehicle body, the stand-off internal lumen, and the locking bracket keyhole, such that a retention cap disposed at a proximal end of the fastening key stem abuts a surface of the accessory attachment plate surrounding the key aperture; and
turning the head of the fastening key to engage at least one bit fixedly disposed within and extending laterally from the distal end portion of the fastening key with the at least one inclined securing structure and move at least one bit along the at least one inclined securing structure ramp and into the respective detent, thereby moving the fastening key longitudinally in a tightening direction and interlocking the fastening key with the locking bracket to secure the vehicle accessory to the vehicle.

13. The method of claim 12, wherein turning the head of the fastening key to interlock the fastening key with the locking bracket comprises compressing at least one biasing device disposed around the fastening key stem as the fastening key accessory retention cap is turned and the at least one bit is move along the at least one inclined securing structure ramp and into the respective detent, thereby providing a resistive force to the fastening key when the fastening key is interlocked with the locking bracket.

14. The method of claim 13, wherein compressing at least one biasing device comprises compressing at least one spring washer.

15. The method of claim 13, wherein compressing at least one biasing device comprises compressing at least one compressible bushing.

16. The method of claim 13, wherein compressing at least one biasing device comprises compressing at least one coil spring.

17. The method of claim 12, wherein turning the head of the fastening key to interlock the fastening key with the locking bracket comprises:

engaging a fastening tool with the cap of the fastening key; and utilizing the fastening tool to turn the fastening key accessory retention cap and interlock the fastening key with the locking bracket.

18. The method of claim 17, wherein engaging a fastening tool with the cap of the fastening key comprises engaging an opening in a head of the fastening tool with a knob of the fastening key cap, the fastening tool opening and the fastening key knob having substantially the same size and a shape.

19. The method of claim 17, wherein engaging a fastening tool with the cap of the fastening key comprises engaging a socket of the head of the fastening tool with a knob of the fastening key cap, the fastening tool socket and the fastening key knob having substantially the same size and a shape.

20. The method of claim 17, wherein engaging a fastening tool with the cap of the fastening key comprises engaging a stud of a head of the fastening tool with a receptacle formed in the fastening key cap, the fastening tool stud and the fastening key receptacle having substantially the same size and a shape.

* * * * *